(12) United States Patent
Anderson et al.

(10) Patent No.: US 7,765,891 B2
(45) Date of Patent: Aug. 3, 2010

(54) ROBOTIC COMPLIANCE MECHANISM

(75) Inventors: Mark Dennis Anderson, Champlin, MN (US); Mark August Toffle, St. Louis Park, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 1347 days.

(21) Appl. No.: 11/166,703

(22) Filed: Jun. 24, 2005

(65) Prior Publication Data

US 2006/0288808 A1 Dec. 28, 2006

(51) Int. Cl.
*B25J 17/00* (2006.01)

(52) U.S. Cl. .................................. 74/490.05

(58) Field of Classification Search ............ 74/78, 74/490.01, 490.05
See application file for complete search history.

(56) References Cited

U.S. PATENT DOCUMENTS

| | | | |
|---|---|---|---|
| 4,627,169 A | 12/1986 | Zafred et al. | |
| 4,636,135 A * | 1/1987 | Bancon | 414/730 |
| 4,650,237 A | 3/1987 | Lessway | |
| 4,669,192 A | 6/1987 | Matheson et al. | |
| 4,697,839 A | 10/1987 | Fischer | |
| 4,799,853 A | 1/1989 | Wrobbel et al. | |
| 4,838,112 A * | 6/1989 | Barner | 74/527 |
| 4,944,650 A | 7/1990 | Matsumoto | |
| 5,025,340 A | 6/1991 | Peters | |
| 5,184,810 A | 2/1993 | Lebrecht | |
| 5,484,219 A | 1/1996 | Drew et al. | |
| 5,520,476 A * | 5/1996 | Marks et al. | 403/322.3 |
| 5,574,216 A | 11/1996 | Hiyama | |
| 5,697,658 A | 12/1997 | Park | |
| 5,855,376 A | 1/1999 | Lillbacka et al. | |
| 6,012,877 A | 1/2000 | McCowin et al. | |
| 6,453,541 B1 | 9/2002 | Guthrie et al. | |

* cited by examiner

*Primary Examiner*—Vicky A Johnson
(74) *Attorney, Agent, or Firm*—McCarthy Law Group

(57) ABSTRACT

A mechanism provides compliance between a tool and a robotic arm and includes a base with a first face. The mechanism includes a post assembly with a thrust washer and a mounting post attached to the thrust washer. The thrust washer engages the first face to form a compliance joint that permits a compliance range of sliding translational motion along the first face. The mechanism comprises springs that slideably engage an outer rim surface of the post assembly and providing a compliance force resisting the sliding translational motion. A retainer is mounted to the base and compresses the thrust washer against the first face and limits rotational motion of the assembly out of a plane of the first face.

20 Claims, 6 Drawing Sheets

ROBOTIC COMPLIANCE MECHANISM

FIELD OF THE INVENTION

The present invention relates generally to robotics, and more particularly but not by limitation to mounting of robotic tools.

BACKGROUND OF THE INVENTION

In disc drives, servo information is encoded on a disc during manufacture. During disc drive operation, the servo information is used to accurately position a read/write head on a particular data track that is to be read or written. The servo information is written or encoded onto the disc with a manufacturing machine called a servo track writer (STW) or multi-disc writer (MDW).

Unformatted discs are assembled with a central hub to form a disc-hub assembly. The central hub includes a bearing and a motor rotor. The disc-hub assembly is positioned in a MDW with the central hub adjacent a motor stator in the MDW and the bearing engaging a central spindle in the MDW. Once the disc-hub assembly is positioned on the rotor, the disc-hub assembly is spun while a write head in the MDW formats the discs with servo information. After formatting is complete, the formatted disc-hub assembly is removed from the MDW and can be assembled into a disc drive.

The fit between surfaces of the bearing and the spindle is extremely close. The bearing must be precisely aligned with the spindle when the bearing is slid into the spindle. The force used to advance the bearing toward the spindle is delicate and must be carefully limited to avoid damage when there is misalignment. The end of the bearing and/or the end of the spindle can be tapered or rounded to provide tactile feedback on alignment to a technician who is manually sliding the bearing onto the spindle.

As attempts are made to automate installation of the disc-hub assembly into the spindle by a robot, problems are encountered. Some existing robot end effector mechanisms have excessively high length and mass, resulting in excessive force when the bearing jams during installation. Some existing robot end effector mechanisms also have flexible connections to power sources such as air lines, hydraulic lines and electrical cables that exert forces on the end effector mechanism that exceed the delicate force required for installation or that adversely change alignment. When air lines are used, the air lines can introduce contaminated air into the clean room environment of the MDW. Existing end effector mechanisms lack a required delicate compliance and precise alignment at an interface with the forces fed back to the end effector mechanism by contacts between the bearing and the spindle.

A method and interface mechanism are needed to provide for robotic installation of disc-hub assemblies on spindles that provides both precise alignment and delicate force compliance. Embodiments of the present invention provide solutions to these and other problems, and offer other advantages over the prior art.

SUMMARY OF THE INVENTION

Disclosed is a mechanism providing compliance between a tool and a robotic arm. The mechanism comprises a base that is mountable to a first one of the robotic arm or tool. The base including a first face.

The mechanism comprises a post assembly. The post assembly comprises a thrust washer with an outer rim surface and a mounting post attached to the thrust washer.

The post assembly is mountable to a second one of the robotic arm or tool. The thrust washer engages the first face to form a compliance joint that permits a compliance range of sliding translational motion along the first face.

The mechanism comprises springs that slideably engage the outer rim surface and providing a compliance force resisting the sliding translational motion. The mechanism comprises a retainer mounted to the base. The retainer compresses the thrust washer against the first face and limits rotational motion of the assembly out of a plane of the first face.

Other features and benefits that characterize embodiments of the present invention will be apparent upon reading the following detailed description and review of the associated drawings.

DETAILED DESCRIPTION OF ILLUSTRATIVE EMBODIMENTS

In the embodiments described below in FIGS. 3-7, a compliance mechanism is disclosed that can be mounted between a robot arm and a robot tool. The compliance mechanism provides compliance motion between the robot arm and the robot tool so that a component being placed on an axle by the robot tool can move slightly to align the component with the shaft, thereby avoiding jamming or damage to the mating surfaces. The compliance mechanism includes springs that can be selected to provide a desired amount of compliance motion corresponding with an amount of compliance force due to misalignment. Various types of springs such as leaf springs, coils springs or ball plungers can be used. One or more thrust bearings in the mechanism provide smooth compliance motion. Precise alignment and delicate force compliance are achieved. The compliance mechanism can effectively replace tactile feedback in hand assembly operations.

Figure 1:
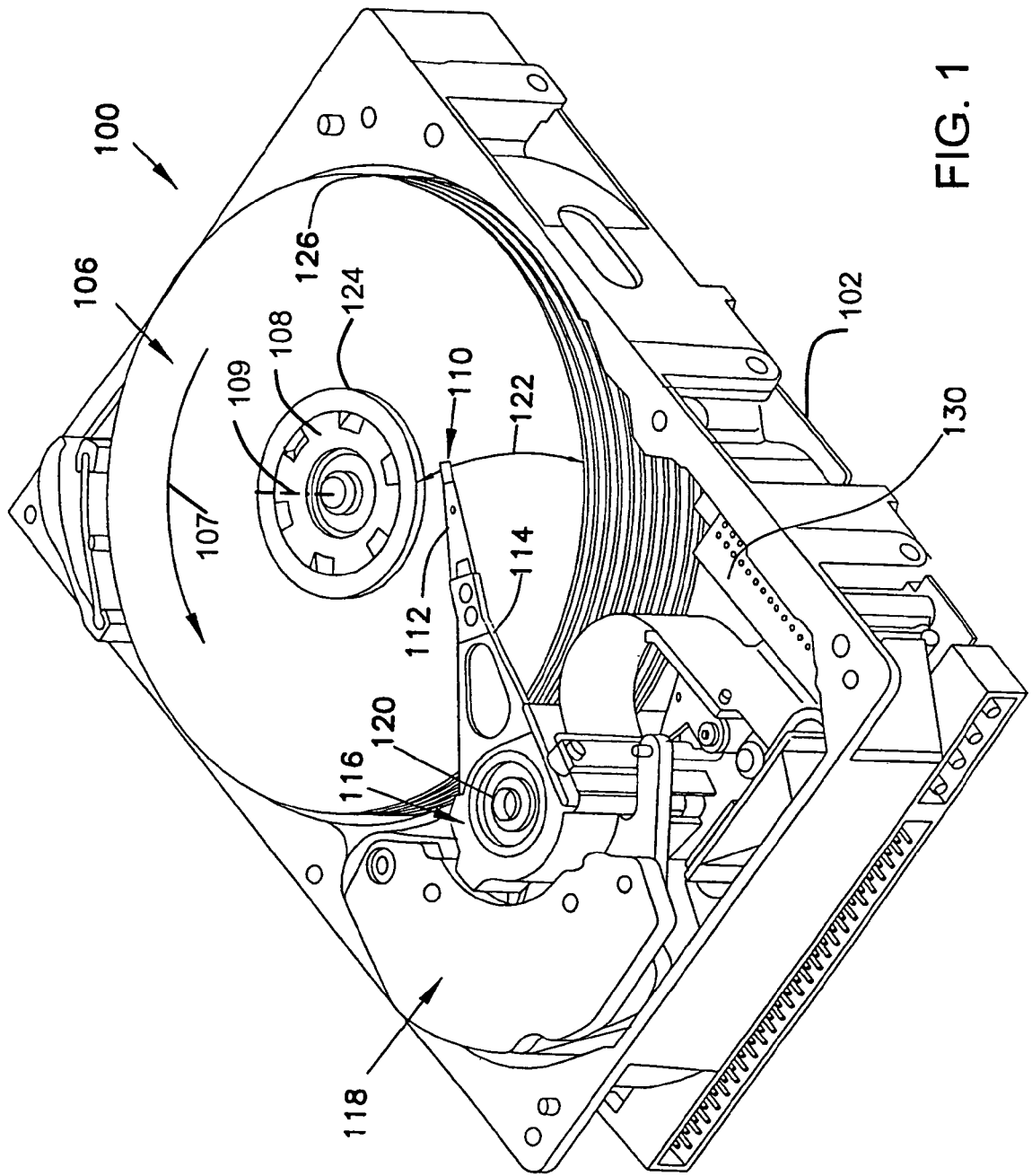
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
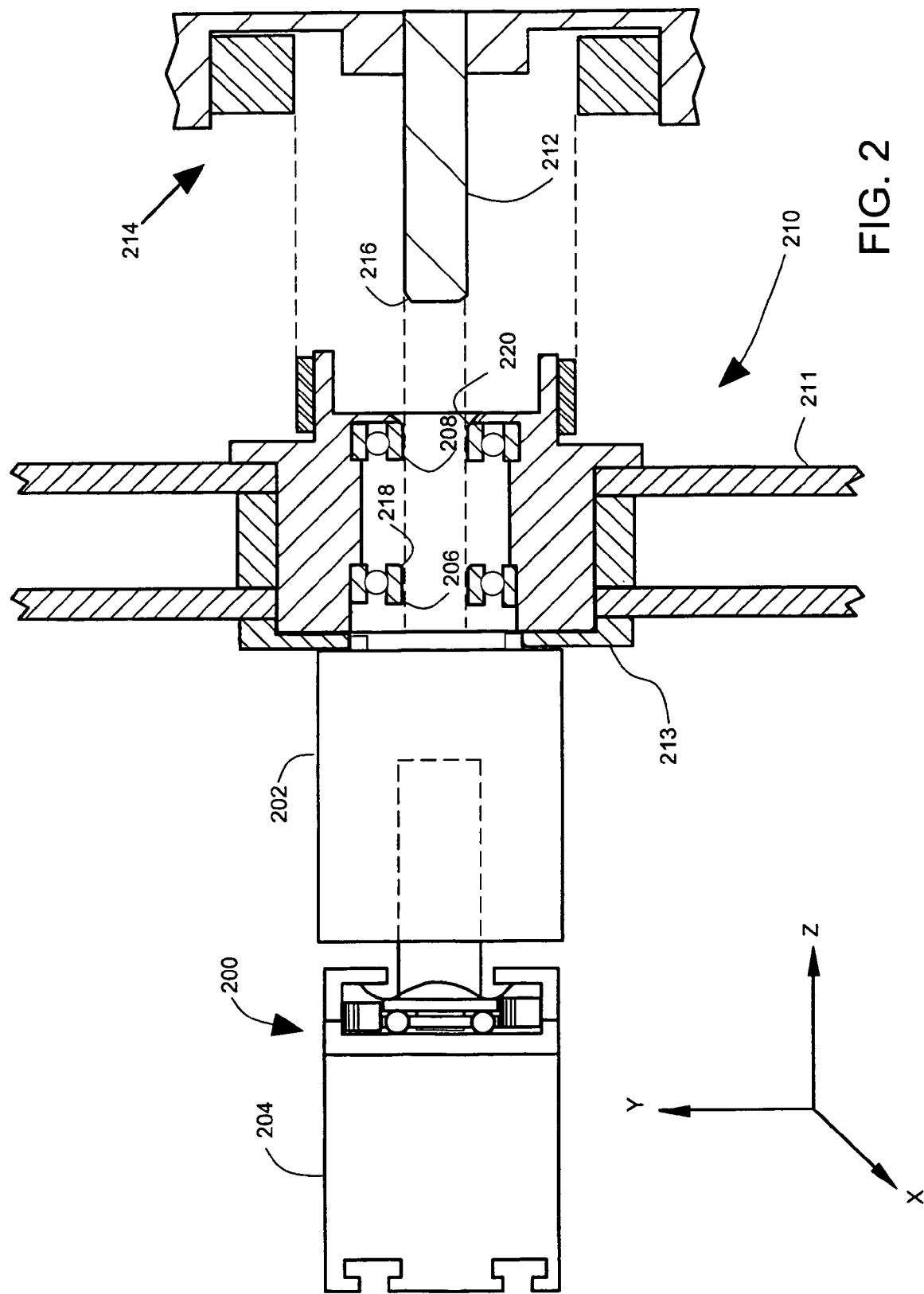
FIG. 2 illustrates a mechanism mounted between a robot arm and a tool.

FIG. 2 illustrates an interface mechanism 200 that can be used for mounting a component installation tool 202 to a robotic arm 204. The robotic arm 204 is arranged to impart translational motion along a Z axis direction in order to slide bearings 206, 208 of a disc-hub assembly 210 onto a spindle 212 of a multi-disc writer 214. The disc hub-assembly 210 comprises magnetic recording discs 211 and a central hub 213. The spindle 212 can be provided with a beveled or rounded leading edge 216 and the bearings 206, 208 can be provided with beveled or rounded leading edges 218, 220. A slightly misaligned leading edge 216 of the spindle 212 can contact a leading bearing edge 218 or 220 during the Z axis translational motion, and the contact produces translational force in the XY plane or rotational force out of the XY plane which can be accommodated by the interface mechanism 200 to bring the spindle 212 into translational and rotational alignment with the bearings 206, 208.

The interface mechanism 200 provides precise alignment of the installation tool 202 to change the position of the bearings 206, 208 so as to slide into the spindle 216 without excessive force that may damage parts. The interface mechanism 200 serves as a substitute for tactile feedback used in manual alignment operations. The interface mechanism 200 provides limited translational mechanical compliance sliding motion in an XY plane in response to forces generated by misaligned contact between the spindle 212 and the bearings 206, 208. The interface mechanism can also provide a limited mechanical compliance rotational motion out of the XY plane in response to rotational forces generated by misaligned contact between the spindle 212 and the bearings 206, 208. An example of an interface mechanism is described in more detail below in connection with an enlarged drawing in FIG. 3.

Figure 3:
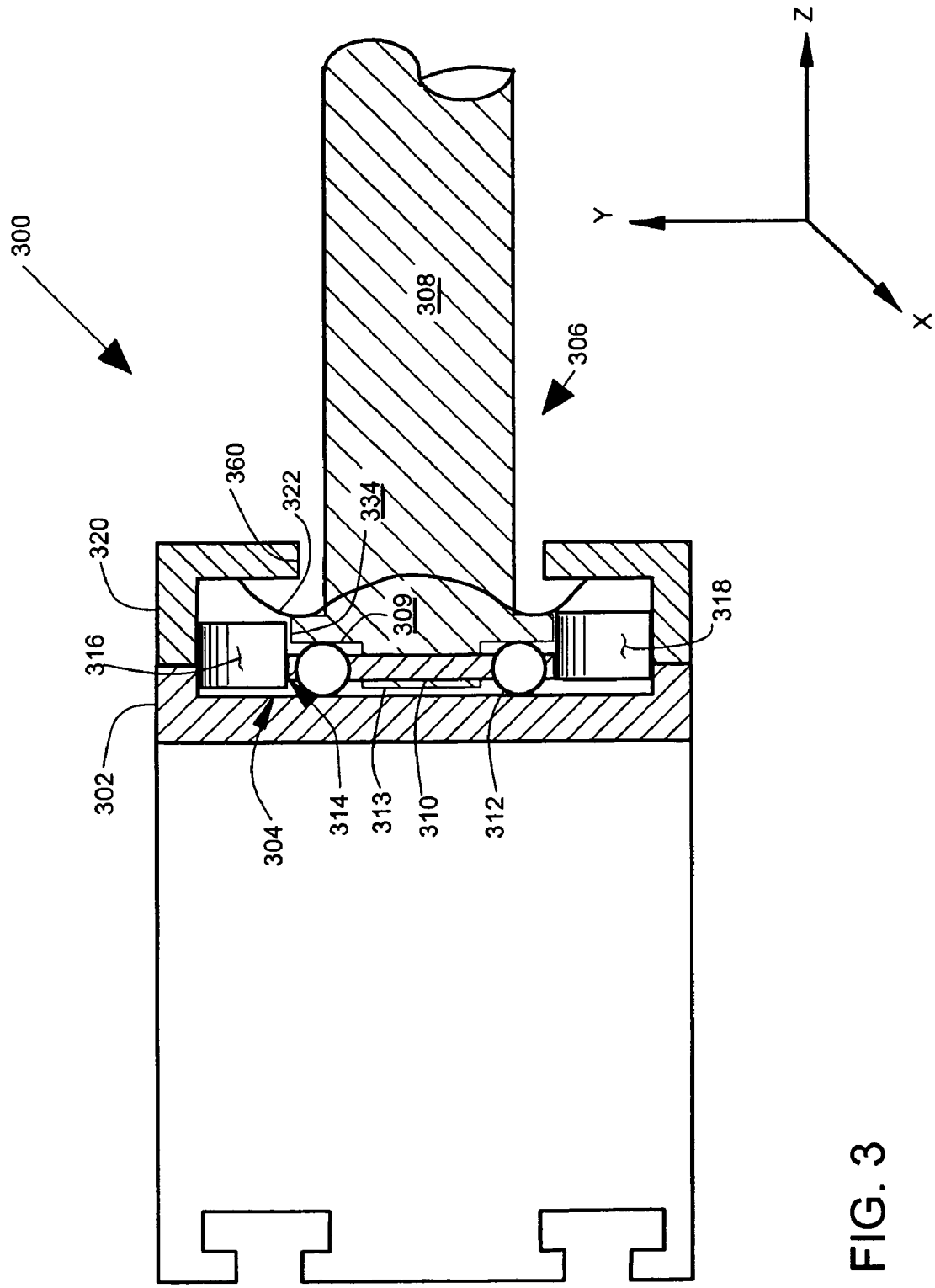
FIGS. 3-6 illustrate a first embodiment of a mechanism that includes springs.

FIG. 3 illustrates an embodiment of an interface mechanism 300. The interface mechanism 300 can be used for mounting a component installation tool to a robotic arm as described above in connection with FIG. 2. The interface mechanism 300 has generally cylindrical cross sections in an XY plane.

The interface mechanism 300 comprises a base 302 that is generally cup-shaped and mountable to the robotic arm, or alternatively mountable to a tool. The base 302 includes a first face 304 that is generally parallel to an XY plane and normal to a Z-axis. The interface mechanism 300 comprises an assembly 306 that is movable or compliant relative to the base 302. The assembly 306 includes a mounting post 308 to which a component installation tool (or alternatively a robotic arm) is mountable as described above in connection with FIG. 2. The assembly 306 comprises a thrust washer 310 that is attached to the mounting post 308. The thrust washer 310 includes ball bearings 312 and engages the first face 304 to form a compliance joint that permits compliant motion between the mounting post 308 and the base 302. The ball bearings are compressed between the first face 304 and a flat annular ring surface 309 on the mounting post 308. This compliance joint permits a limited compliance range of sliding motion in an XY plane that is normal to the Z-axis. The compliance joint resists large rotational motion out of an XY plane normal to the Z-axis, but permits a small rotational compliance motion out of the XY plane. The assembly 306 further comprises an outer rim surface 314 of a bearing cage portion on the thrust washer 310.

Leaf springs 316, 318 slideably engage the outer rim surface 314 and provide a compliance force resisting the sliding motion. A retainer 320 is generally cup shaped and mounted to the base 302. The retainer 320 provides a force through a spring washer 322 that compresses the thrust washer 310 against the first face 304. The retainer 320 and the spring washer 322 limit rotational motion of the assembly 306 out of the XY plane normal to the Z axis and also limits translational motion (parallel to the face 304) of the assembly 308 along the Z axis. In a preferred embodiment, the retainer 320 comprises a stop surface 360 that engages the mounting post 308 to limit overtravel of the mounting post 308 relative to the base 302. The translational and rotational compliances of the interface mechanism can be set separately by the selection of spring constants of springs 316, 318 and the spring constants of spring washer 322. The spring washer 322 can comprise a Belleville washer or a wave washer.

It is understood that in some installations, it is convenient to reverse the orientation of the interface mechanism 300 so that the mounting post 308 mounts to a robotic arm while the base 302 mounts to a tool, and that the interface mechanism 300 functions in substantially the same way in both orientations.

The interface mechanism 300 is described in more detail below in connection with FIGS. 4-6. Reference numbers used in FIG. 4-6 that are the same as reference numbers used in FIG. 3 identify the same features.

Figure 4:
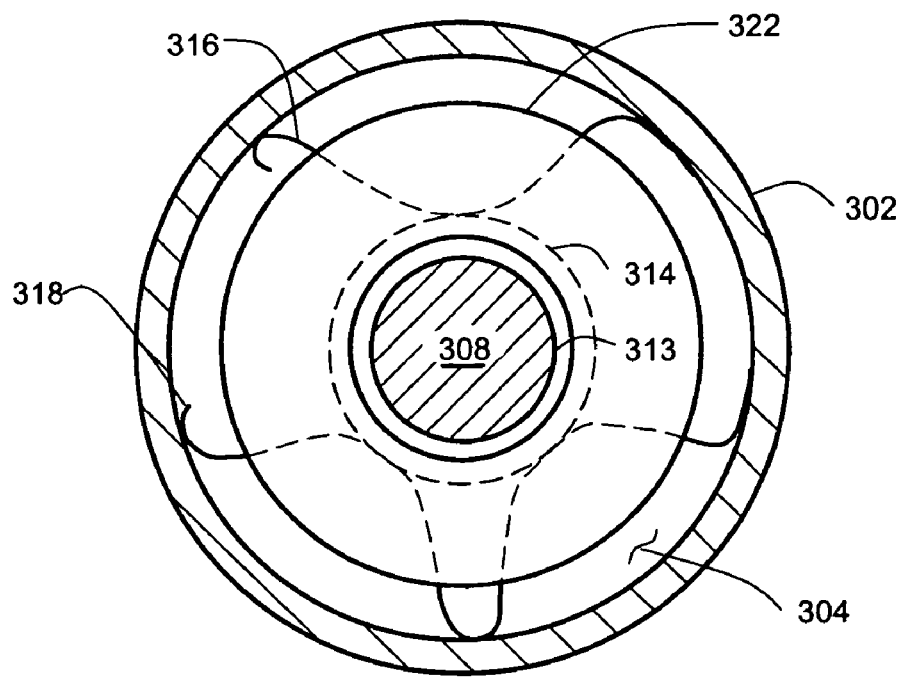

FIG. 4 illustrates the interface mechanism 300 with the retainer 320 removed. The spring washer 322 is illustrated in FIGS. 3 and 4. Spring washer 322 preferably comprises one (or more) Belleville-type or wave washer-type spring washers formed of spring steel sheet.

Figure 5:
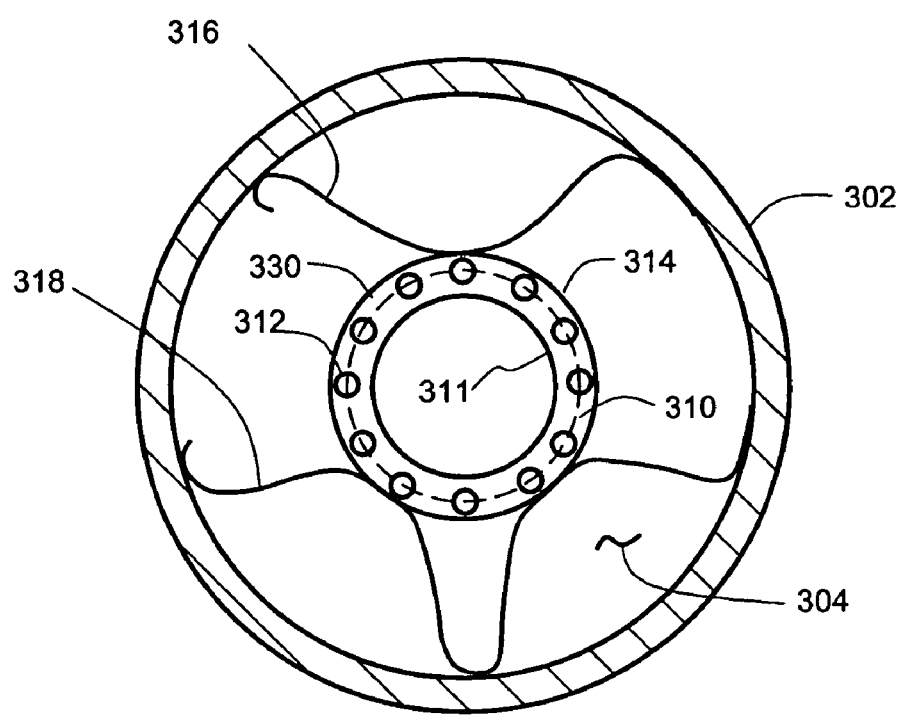

FIG. 5 illustrates the interface mechanism 300 with the retainer 320, the spring washer 322 and the mounting post 308 removed. The leaf springs 316, 318 are illustrated in FIG. 5. The leaf springs 316, 318 are preferably formed from strips of spring steel that has been curled to fit between the outer rim 314 and the inner rim of base 302. An inner rim 311 (FIG. 5) of the thrust washer 310 engages a cylindrical projection 313 (FIGS. 3-4) of the mounting post 308. The thrust washer 310 includes a bearing cage 330 that retains the ball bearings 312. The ball bearing cage 330 can include the outer rim surface 314 that engages the springs 316, 318. Alternatively, the mounting post 308 can comprise a journal surface 334 (FIG. 3) that serves as an outer rim surface that engages the springs 316, 318.

Figure 6:
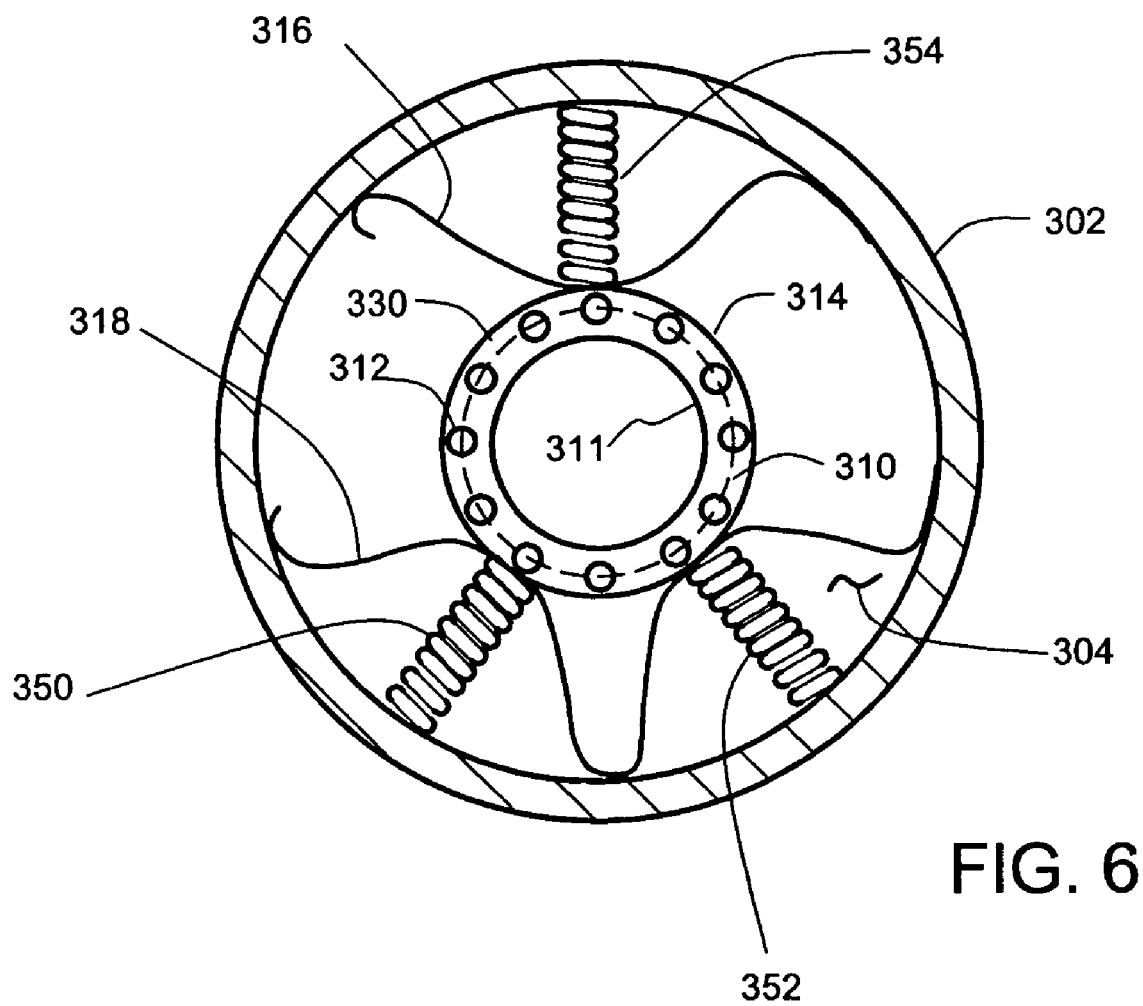

As illustrated in FIG. 6, the springs 316, 318 can comprise single leaf springs or multiple leaf springs. Alternatively, the springs can comprise coil springs 350, 352, 354 (FIG. 6) that are used alone, or in combination with leaf springs 316, 318. When the mechanism 300 is used in an application where actuation along the Z axis is horizontal as illustrated in FIG. 2, The spring constants of the individual springs can be different to vary the load along the Y-axis to compensate for gravity. Detents (not illustrated) can be provided to prevent relative rotation about the Z axis between the base and the mounting post.

Figure 7:
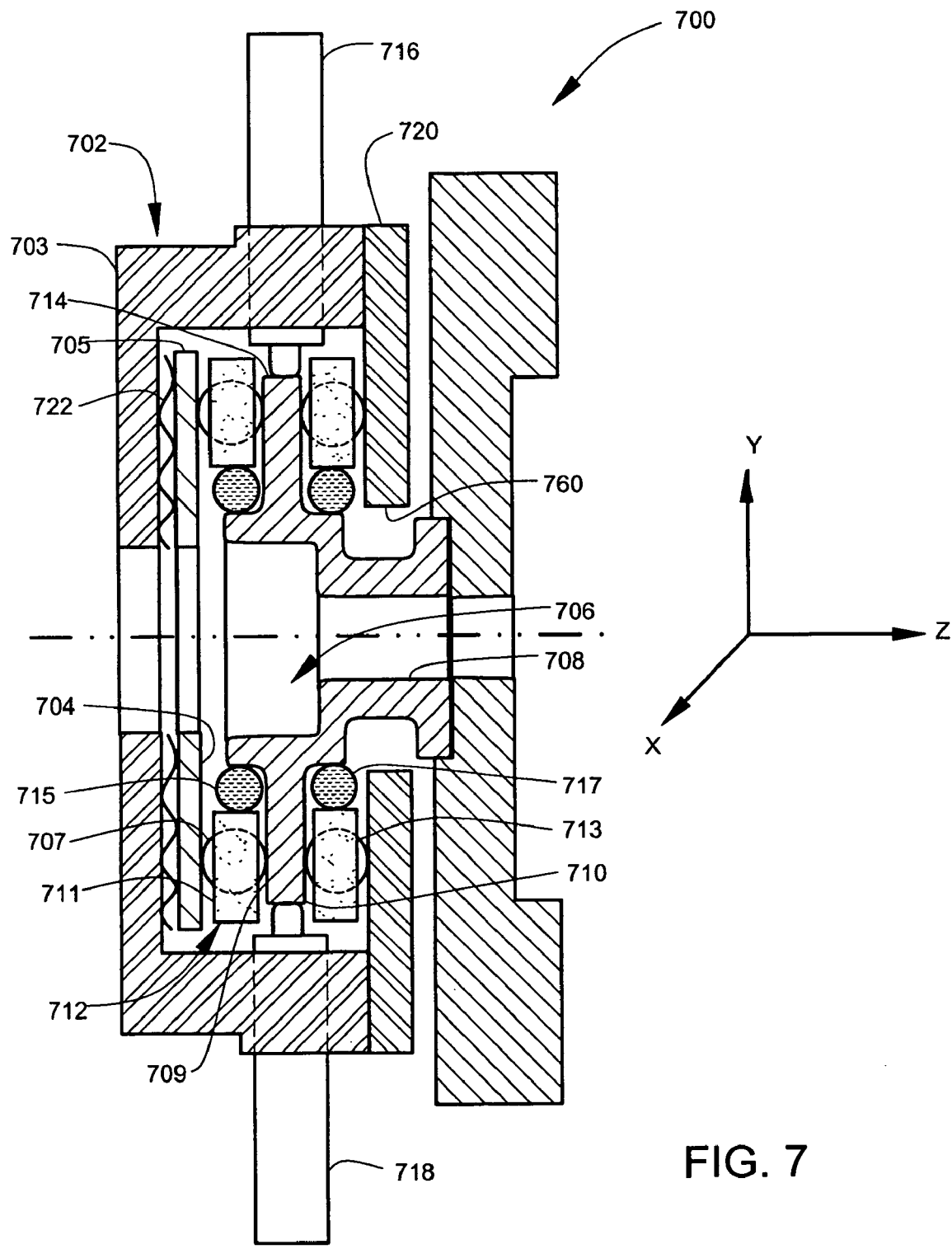
FIG. 7 illustrates a second embodiment of a mechanism that includes ball plungers.

FIG. 7 illustrates an embodiment of an interface mechanism 700. The interface mechanism 700 can be used for mounting a component installation tool to a robotic arm as described above in connection with FIG. 2. The interface mechanism 700 has generally cylindrical cross sections in an XY plane.

The interface mechanism 700 comprises a base 702 that is generally cup-shaped and mountable to a component installation tool (or alternatively to a robotic arm). The base 702 comprises a base cup 703 and a disc 705 that is inside the base cup 703. The disc 705 has a first face 704 that is normal to a Z-axis. The disc 705 is coupled to the base cup 703 by a spring washer 722. The spring washer 722 (preferably a wave washer or a Belleville washer) provides a controlled, limited amount of compliance.

The interface mechanism 700 comprises a post assembly 706 that includes a mounting post 708 which is mountable to a robotic arm (or alternatively mounted to a tool) as described above in connection with FIG. 2. The mounting post 708 includes a flat rim 710 that extends radially outward from a central axis. A thrust washer 712 includes a ball bearing cage 711 and ball bearings 707. The thrust washer 712 is retained on the mounting post 708 by an O-ring 715. The thrust washer 712 engages the first face 704 to form a compliance joint that permits compliant motion between the mounting post assembly 706 and the base 702. The thrust washer 712 is compressed between the first face 704 and a flat annular ring surface 709 on the mounting post 708. A second thrust washer 713 is retained by O-ring 717. The compliance joint permits a limited compliance range of sliding motion in an XY plane that is normal to the Z-axis. The compliance joint resists large rotational motion out of an XY plane normal to the Z-axis, but permits a small rotational compliance motion out of the XY plane.

An outer rim surface 714 on the flat rim 710 of the post assembly 706 engages springs 716, 718. Springs 716, 718 slideably engage the outer rim surface 714 and provide a compliance force resisting the sliding motion. Typically four such springs are provided. Springs 716, 718 preferably comprise ball plungers such as those provided by Vlier, Inc. of Brighton, Mass. A ball plunger typically comprise a small, externally threaded tube that houses a compressed coil spring which presses against a captive ball at an end of the ball plunger. The outer rim surface 714, which is generally cylindrical, preferable comprises flats that engage the balls of the ball plungers to limit rotation of the flat rim 710 around the Z-axis. A retainer 720 is generally plate shaped and mounted to the base 702 to provide a compressive load on the spring washer 722. The retainer 720 provides a force through the spring washer 722 that compresses the thrust washer 712 against the first face 704. The retainer 720 and the spring washer 722 limit rotational motion of the post assembly 706 out of the XY plane normal to the Z axis and also limits translational motion (parallel to the face 704) of the post assembly 706 along the Z axis. In a preferred embodiment, the retainer 720 comprises a stop surface 760 that engages the mounting post 708 to limit overtravel of the mounting post 708 relative to the base 702. The translational and rotational compliances of the interface mechanism can be set separately by the selection of spring constants of springs 716, 718 and the spring constants of spring washer 722.

In some applications for the mechanism described above in FIGS. 3-7, it is convenient for the base to be mounted to the robotic arm while the mounting post is mounted to a tool. In other applications, it is convenient for the base to be mounted to the tool while the mounting post is mounted to the robotic arm. In both cases, the base is mountable to a first one of the robotic arm and tool, while the mounting post is attached to a second one of the robotic arm and tool. All such mounting options are contemplated for the mechanism embodiments described above. The mechanisms are reversible in terms of mounting. After a mechanism is actuated by use in part placement, the mechanism automatically returns to a central alignment position and is aligned and ready for the next use.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the mechanism while maintaining substantially the same functionality without departing from the scope and spirit of the present invention. In addition, although the preferred embodiment described herein is directed to a mechanism for mounting to a post, it will be appreciated by those skilled in the art that the teachings of the present invention can be applied to other mechanical mounting interfaces, without departing from the scope and spirit of the present invention.

What is claimed is:

1. A compliance mechanism comprising:
    a base member defining a first bearing surface;
    a compliance member defining a second bearing surface extending substantially parallel to the first bearing surface during movement of the compliance member with respect to the base member associated with a lateral in-plane displacement of the compliance member;
    a roller bearing disposed between the base member and the compliance member to operably roll against both the first bearing surface and the second bearing surface during the lateral in-plane displacement of the compliance member; and
    a biasing arrangement, not contacting the roller bearing, urging the compliance member to remain at a nominal lateral position in opposition to forces that displace the compliance member, and urging the second bearing surface to remain substantially parallel to the first bearing surface in opposition to the forces that displace the compliance member.

2. The compliance mechanism of claim 1 wherein the biasing arrangement comprises a first resilient member imparting a lateral force to the compliance member.

3. The compliance mechanism of claim 2 wherein the first resilient member is connected to the bearing cage.

4. The compliance mechanism of claim 2 wherein the first resilient member comprises a leaf spring.

5. The compliance mechanism of claim 2 wherein the first resilient member comprises a plunger.

6. The compliance mechanism of claim 2 wherein the first resilient member comprises a coil spring.

7. The compliance mechanism of claim 2 wherein the biasing arrangement comprises a plurality of first resilient members imparting opposing lateral forces to the compliance member.

8. The compliance mechanism of claim 7 wherein magnitudes of two of the opposing lateral forces are different.

9. The compliance mechanism of claim 1 wherein the biasing arrangement comprises a second resilient member that urges the second bearing surface toward the roller bearing.

10. The compliance mechanism of claim 9 wherein the second resilient member comprises a spring washer.

11. The compliance mechanism of claim 1 wherein the biasing arrangement comprises:
    a first resilient member imparting a lateral force to the compliance member, and
    a second resilient member imparting a longitudinal force that urges the second bearing surface toward the roller bearing, wherein magnitudes of the lateral and longitudinal forces are different.

12. The compliance mechanism of claim 1 wherein the base member defines two first bearing surfaces and the compliance member defines two second bearing surfaces, and wherein a first roller bearing operably rolls against both of one set of first and second bearing surfaces and a second roller bearing operably rolls against both of the other set of first and second bearing surfaces during the lateral in-plane displacement of the compliance member.

13. A method for connecting a first article to a second article, comprising:
  obtaining a compliance mechanism comprising:
    a base member defining a first bearing surface;
    a compliance member defining a second bearing surface extending substantially parallel to the first bearing surface during movement of the compliance member with respect to the base member associated with a lateral in-plane displacement of the compliance member;
    a roller bearing disposed between the base member and the compliance member to operably roll against both the first bearing surface and the second bearing surface during the lateral in-plane displacement of the compliance member; and
    a biasing arrangement, not contacting the roller bearing, urging the compliance member to remain at a nominal lateral position in opposition to forces that displace the compliance member, and urging the second bearing surface to remain substantially parallel to the first bearing surface in opposition to the forces that displace the compliance member;
  connecting the base to one of the first and second articles; and
  connecting the compliance member to the other of the first and second articles, wherein the compliance member is displaceable with respect to the base member in order to compensate for a misalignment between the first and second articles.

14. The method of claim 13 wherein the obtaining step is characterized by the biasing arrangement having a first resilient member that imparts a lateral force to the compliance member.

15. The method of claim 14 wherein the obtaining step is characterized by the biasing arrangement having a plurality of first resilient members that impart opposing lateral forces to the compliance member.

16. The method of claim 13 wherein the obtaining step is characterized by the biasing arrangement having a second resilient member that urges the second bearing surface toward the roller bearing.

17. The method of claim 13 wherein the obtaining step is characterized by the biasing arrangement having a first resilient member imparting a lateral force to the compliance member, and a second resilient member imparting a longitudinal force that urges the second bearing surface toward the roller bearing, wherein magnitudes of the lateral and longitudinal forces are different.

18. The method of claim 13 wherein the obtaining step is characterized by the base member defining two first bearing surfaces and the compliance member defining two second bearing surfaces, and wherein a first roller bearing operably rolls against both of one set of first and second bearing surfaces and a second roller bearing operably rolls against both of the other set of first and second bearing surfaces during the lateral in-plane displacement of the compliance member.

19. A compliance mechanism comprising:
  a base member defining a first bearing surface;
  a compliance member defining a second bearing surface extending substantially parallel to the first bearing surface during movement of the compliance member with respect to the base member associated with a lateral in-plane displacement of the compliance member;
  a bearing cage attached to the compliance member and supporting a plurality of spatially separated roller bearings disposed between the base member and the compliance member to operably roll against both the first bearing surface and the second bearing surface during the lateral in-plane displacement of the compliance member; and
  a biasing arrangement urging the compliance member to remain at a nominal lateral position in opposition to forces that displace the compliance member, and urging the second bearing surface to remain substantially parallel to the first bearing surface in opposition to the forces that displace the compliance member.

20. A compliance mechanism comprising:
  a base member defining a first bearing surface;
  a compliance member defining a second bearing surface extending substantially parallel to the first bearing surface during movement of the compliance member with respect to the base member associated with a lateral in-plane displacement of the compliance member;
  a bearing cage attached to the compliance member, the bearing cage supporting a plurality of spatially separated roller bearings disposed between the base member and the compliance member to operably roll against both the first bearing surface and the second bearing surface during the lateral in-plane displacement of the compliance member; and
  a biasing arrangement having a first resilient member connected to the bearing cage and imparting a lateral force urging the compliance member to remain at a nominal lateral position in opposition to forces that displace the compliance member, and the biasing arrangement further urging the second bearing surface to remain substantially parallel to the first bearing surface in opposition to the forces that displace the compliance member.

* * * * *